(12) United States Patent
Chen et al.

(10) Patent No.: US 10,656,637 B2
(45) Date of Patent: May 19, 2020

(54) MONITORING SYSTEM AND MONITORING METHOD

(71) Applicant: INSTITUTE FOR INFORMATION INDUSTRY, Taipei (TW)

(72) Inventors: Jun-Ren Chen, Taichung (TW); Hung-Sheng Chiu, Taichung (TW); Chih-Chieh Lin, Taipei (TW); Chien-Chih Lu, Taichung (TW); Cheng-Tsai Lai, Nantou County (TW); Kun-Yu Lin, Changhua County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 304 days.

(21) Appl. No.: 15/939,263

(22) Filed: Mar. 28, 2018

(65) Prior Publication Data

US 2019/0155269 A1    May 23, 2019

(30) Foreign Application Priority Data

Nov. 17, 2017  (TW) .............................. 106139977 A (51) Int. Cl.
 *G05B 23/02* (2006.01)
 *G05B 19/048* (2006.01)
 (Continued)

(52) U.S. Cl.
 CPC ....... *G05B 23/0235* (2013.01); *G05B 19/048* (2013.01); *G05B 19/406* (2013.01);
 (Continued)

(58) Field of Classification Search
 CPC ................ G05B 19/048; G05B 19/406; G05B 23/0235; G05B 23/0272; G06Q 10/0639; G07C 3/00
 (Continued)

(56) References Cited

U.S. PATENT DOCUMENTS 8,781,982 B1 *    7/2014  Das .................... G06N 20/00
                                                      706/21
2016/0091393 A1 *   3/2016  Liao .................. B23Q 17/0995
                                                      702/34

FOREIGN PATENT DOCUMENTS

TW          412480 B      11/2000
TW      200848199 A      12/2008

OTHER PUBLICATIONS

The examination report of the corresponding Taiwanese application dated Mar. 12, 2018.

* cited by examiner

*Primary Examiner* — John H Le
(74) *Attorney, Agent, or Firm* — CKC & Partners Co., LLC (57) ABSTRACT

A monitoring system applied to a shaping machine having a high speed electricity meter. The monitoring system includes a current obtaining device and an analyzing device. The current obtaining device is coupled to the high speed electricity meter to obtain a plurality of current signals from the operated shaping machine and in respond to the shaping machine executes a machining program, the current obtaining device extracts current variation data from the current signals. The machining program corresponds to a piece of the current variation data. The piece of the current variation datum comprises a maximum current and an occurring time that the maximum current being recorded. The analyzing device is configured to calculate a gap, based on the maximum currents and the occurring times corresponding to at least two successive machining programs. In respond to the gap time exceeding a predetermined threshold, the analyzing device generates a warning signal.

18 Claims, 4 Drawing Sheets

(51) Int. Cl.
*G07C 3/00* (2006.01)
*G05B 19/406* (2006.01)
*G06Q 10/06* (2012.01)

(52) U.S. Cl.
CPC ........... *G05B 23/0272* (2013.01); *G07C 3/00* (2013.01); *G06Q 10/0639* (2013.01)

(58) Field of Classification Search
USPC .................................... 702/34, 35, 183, 188
See application file for complete search history.

```
S601: obtaining, by a current obtaining device, a plurality of current
signals from the operated shaping machine and extracting current
variation data from the current signals, wherein each piece of the
current variation data corresponds to a machining program
executed by the shaping machine and each piece of the current
variation data comprises a maximum current and an occurring
time that the maximum current being recorded
```

```
S602: calculating a gap time, based on the maximum currents and the
occurring times respectively corresponding to at least two
successive machining programs, by an analyzing device, and
generating a warning signal in respond to the gap time exceeding
a predetermined threshold by the analyzing device
```

```
S603: obtaining, by the analyzing device, a plurality of control signals
from the controller
```

```
S604: determining, by the analyzing device, whether the shaping
machine is actually executing the machining programs at the
occurring times that the maximum currents being recorded
```

```
S605: if the shaping machine is being determined as not executing the
machining program at one of the occurring times that the
maximum currents being recorded, determining the one of the
occurring times as a false event by the analyzing device
```

Fig. 6

MONITORING SYSTEM AND MONITORING METHOD

CROSS-REFERENCE TO RELATED APPLICATION

This application claims priority to Taiwan Application Serial Number 106139977, filed on Nov. 17, 2017, which is herein incorporated by reference.

BACKGROUND

Technical Field

Present disclosure relates to a monitoring system and a monitoring method. More particularly, present disclosure relates to monitoring system and method applied on shaping machines.

Description of Related Art

Due to the growth of electronics industry and automotive industry, shaping manufacturing processes, such as the stamping press process or the injection molding process, are in great demand. Therefore, to meet the demand, the efficiency and the accuracy of these shaping manufacturing processes are significant. In this case, it is crucial to build an effective system for monitoring the efficiency and the accuracy in the shaping manufacturing processes.

For now, in the industries, most approaches for monitoring shaping processes are applying many sensors on the shaping machines, or introducing a MES (Manufacturing Execution System), to establish a long-term monitoring on the shaping machines and thereby to improve the efficiency of the shaping processes. However, the costs of aforementioned approaches are extremely high. Moreover, it requires very professional skills to establish the configuration and calibration to the sensors being settled on the shaping machine, which means that the aforementioned approaches are difficult for the operators and the administrators in the forefront of production to manipulate.

Aiming to solve aforementioned problems, a monitoring system and a monitoring method are provided.

SUMMARY

The disclosure provides a monitoring system, which is applied on a shaping machine having a high speed electricity meter. The monitoring system includes a current obtaining device and an analyzing device. The current obtaining device is communicatively coupled to the high speed electricity meter. The current obtaining device is configured to obtain a plurality of current signals from the high speed electricity meter during operations of shaping machine, and in respond to the shaping machine executes a machining program, the current obtaining device extracts current variation data from the current signals. The machining program corresponds to a piece of the current variation data. The piece of current variation data includes a maximum current and an occurring time that the maximum current being recorded. The analyzing device is electrically coupled to the current obtaining device. The analyzing device is configured to calculate a gap time, based on the maximum currents and the occurring times respectively corresponding to at least two successive machining programs. In respond to the gap time exceeds a predetermined threshold, the analyzing device generates a warning signal.

Another aspect of present disclosure is to provide a monitoring method. The monitoring method is applied on a shaping machine having a high speed electricity meter. The monitoring method comprises following steps: obtaining, by a current obtaining device, a plurality of current signals from the high speed electricity meter during operations of the shaping machine; in respond to the shaping machine executes a machining program, extracting current variation data from the current signals by the current obtaining device, wherein the machining program corresponds to a piece of the current variation data, and the piece of current variation data comprises a maximum current and an occurring time that the maximum current being recorded; calculating a gap time, based on the maximum currents and the occurring times respectively corresponding to at least two successive machining programs, by an analyzing device; and in respond to the gap time exceeding a predetermined threshold, generating a warning signal by the analyzing device.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
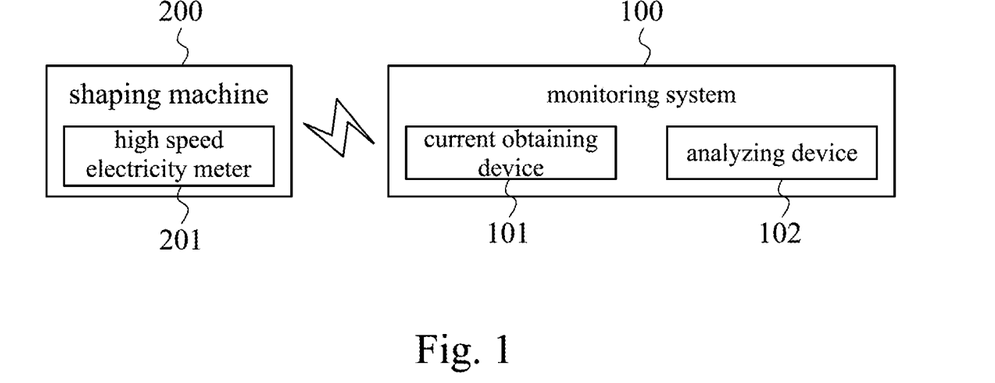
FIG. 1 is a schematic diagram of a monitoring system according to one embodiment of the present disclosure.

FIG. 1 is a schematic diagram of a monitoring system according to one embodiment of the present disclosure. As shown in FIG. 1, in the embodiment, the monitoring system 100 is communicatively coupled to the shaping machine 200. It is noted, being communicatively coupled means that the monitoring system 100 and the shaping machine 200 can interchange information with each other, and it is not limited to a direct connection via physical cables or an indirect connection via wireless communication. In the embodiment, the shaping machine 200 can be a stamping press machine or an injection molding machine. The stamping press machine is a machine configured to manufacture shaped parts by stamping metallic or some other materials with pressures. Usually, the stamping press machine is associated with some molds to establish punching shear processes, forming processes, deep drawing processes or metal forging processes. On the other hand, the injection molding machine is a machine configured to form shaped parts by injecting melted plastic materials into enclosed shaping molds.

In the embodiment, the shaping machine 200 includes a high speed electricity meter 201, in which the high speed electricity meter 201 is configured to measure currents when the shaping machine 200 is executing machining programs. Usually, it takes less than one second for the shaping machine 200 to execute a single machining program. In this case, the high speed electricity meter 201 can be a rapid response electricity meter with a sample rate higher than 20 Hz so that the shaping machine 200 can measure the currents corresponding to such an instant machining program accurately and further output information regarding the measured currents.

In the embodiment, the monitoring system 100 includes a current obtaining device 101 and an analyzing device 102. The current obtaining device 101 is communicatively coupled to the high speed electricity meter 201 of the shaping machine 200. When the shaping machine 200 is in operation, the current obtaining device 101 is configured to obtain the current signals generated by the operations of the shaping machine 200. The current signals include current variation data regarding each time that the shaping machine 200 executes the machining programs. Moreover, a piece of the current variation data includes a maximum current and an occurring time corresponding to the time that the maximum current being recorded. It is noted, the high speed electricity meter 201 of the shaping machine 200 is configured to measure the current signals generated by the shaping machine 200. When not executing the machining programs, the current signals generated by the shaping machine 200 is steady. However, in the instances that the shaping machine 200 executes the machining programs, significant variations are reflected on the current signals. During the shaping machine 200 is executing the machining programs, the value of the current signals shows a sudden increase, then the value drops after the increase. Basically, the execution of one machining program can be reflected on the current signals as a wave, in which the peak of the wave is corresponding to the maximum current. Since the occurrence of the maximum current is an instant event, the high speed electricity meter 201 of the shaping machine 200 is settled to measure the current signals, with each of the peaks included. And the current obtaining device 101 is configured to extract these maximum currents from the current signals being measured.

In the embodiment, the monitoring system 100 includes the current obtaining device 101 and the analyzing device 102. The current obtaining device 101, for example, can be a programmable logic controller (PLC). The analyzing device 102, for example, can be a central processing unit (CPU), a computing device, a computer or a graphic processing unit. The analyzing device 102 is electrically coupled to the current obtaining device 101. The current obtaining device 101 is configured to retrieve, from the high speed electricity meter 201, the current signals generated by the operated shaping machine 200 and extracting the occurring times corresponding to each of the current signals being measured. Furthermore, in each of the machining programs, the current obtaining device 101 can extract, from the current signals, the maximum currents and the occurring time corresponding to the maximum currents to form the current variation data. It is noted, in the embodiment, said maximum current is the current having current value that is significantly higher the values of the other currents being recorded when the shaping machine 200 is not executing the machining programs. It is further noted, although each machining program may be corresponding to one maximum current and one occurring time, the values of the maximum currents corresponding to different machining programs may be different. The analyzing device 102 is configured to analyze each piece of the current variation data to extract the maximum currents and the occurring times corresponding to these maximum currents. The analyzing device 102 is further configured to calculate a gap time between the occurring times corresponding to each pair of the successive maximum currents in order to estimate the time difference between each pair of the successive machining programs. It is noted, when an obvious current variation is captured by the current obtaining device 101 in a specific time interval, it usually means that the shaping machine 200 executes a machining program in the specific time interval. The analyzing device 102 of present disclosure is configured to capture the occurring time of one maximum current in the current signals and calculate the time difference between this occurring time and another occurring time prior to this occurring time. As such, the gap time between two machining programs executed by the shaping machine 200 can be determined.

In the embodiment, the analyzing device 102 calculates the gap times between the occurring times of each pairs of these successive maximum currents, when any of the gap times exceeds a predetermined threshold, the analyzing device 102 can generate a warning signal. It is noted, the predetermined threshold can be a value settled in advance by an operator of the shaping machine 200 or an administrator of the monitoring system 100. The value of the predetermined threshold can be modified by the operator of the shaping machine 200 or the administrator of the monitoring system 100 afterwards. For example, the administrators or experienced operators can settle or modify the predetermined threshold based on their experiences. In other words, if the analyzing device 102 captured that two maximum currents in the current signals are occurred with a gap time longer than the predetermined threshold, it substantially means that there are two successive machining programs performed by the shaping machine 200 fail to meet the expectation of the operator or the administrator. As such, the analyzing device 102 generates the warning signal. And, through the warning signal, the operator of the shaping machine 200, or the administrator of the monitoring system 100, aware the gap time between at least two successive machining programs performed by the shaping machine 200 is abnormal. Then, the administrator of the monitoring system 100 can further evaluate the performance of the operator of the shaping machine 200, or the shaping machine 200 of itself.

Figure 2:
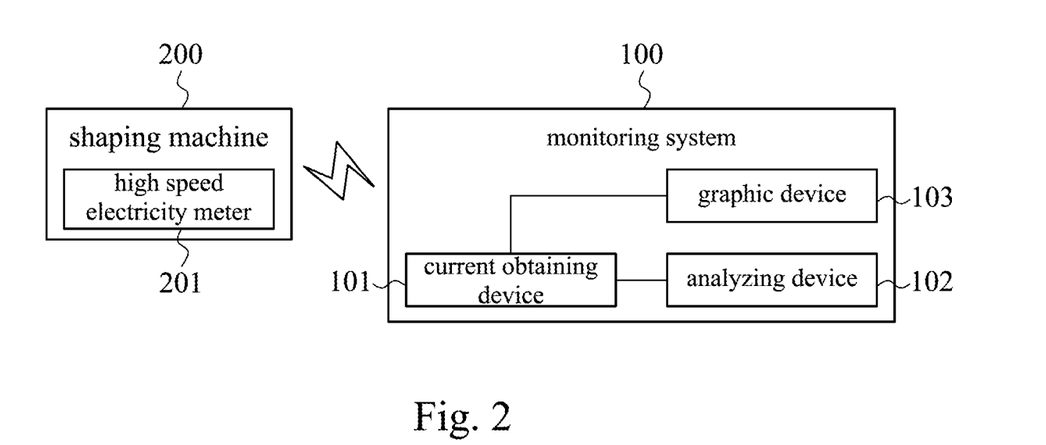
FIG. 2 is a schematic diagram of a monitoring system according to one embodiment of the present disclosure.

FIG. 2 is a schematic diagram of a monitoring system according to one embodiment of the present disclosure. As shown in FIG. 2, in the embodiment, the monitoring system 100 is communicatively coupled to the shaping machine 200, in which the shaping machine 200 can be the stamping press machine or the injection molding machine. As same as forgoing embodiment, the shaping machine 200 has the high speed electricity meter 201, and the high speed electricity meter 201 is the electricity meter with higher than 20 Hz sample rate. The high speed electricity meter 201 is configured to measure the currents generated by the operated shaping machine 200. In the embodiment, the monitoring system 100 includes the current obtaining device 101, the analyzing device 102 and the graphic device 103. In the embodiment, the current obtaining device 101 is communicatively coupled to the high speed electricity meter 201 of the shaping machine 200. When the shaping machine 200 is in operation, the current obtaining device 101 is configured to obtain the current signals generated by the operations of the shaping machine 200. Therefore, it can generate the current variation data regarding each time that the shaping machine 200 executes the machining programs, in which each piece of the current variation data includes the maximum current and the occurring time corresponding to the time that the maximum current being recorded. Moreover, the analyzing device 102 is electrically coupled to the current obtaining device 101. When the current obtaining device 101 obtains the current signals generated by the operations of the shaping machine 200 from the high speed electricity meter 201 in a continuous manner, the analyzing device 102 records the times corresponding to the occurring times that the maximum currents are recorded.

In the embodiment, the graphic device 103 is electrically coupled to the current obtaining device 101, in which the graphic device 103 is configured to display graphics corresponding to the maximum currents, with some displays (not shown in figure) settled on the shaping machine 200 or the monitoring system 100. For example, when the current obtaining device 101 keeps obtaining the current signals from the operated shaping machine 200, the graphic device 103 can display result tables or continuous waveform diagrams regarding the obtained current signals on said display. In this way, the operator of the shaping machine 200 or the administrator of the monitoring system 100 can view the continuous waveform diagrams to find out the current peaks and values corresponding to the current signals. Usually, each executed machining program can be performed as one waveform having a peak, in which the peak is corresponding to the occurrence of the maximum current.

Figure 3:
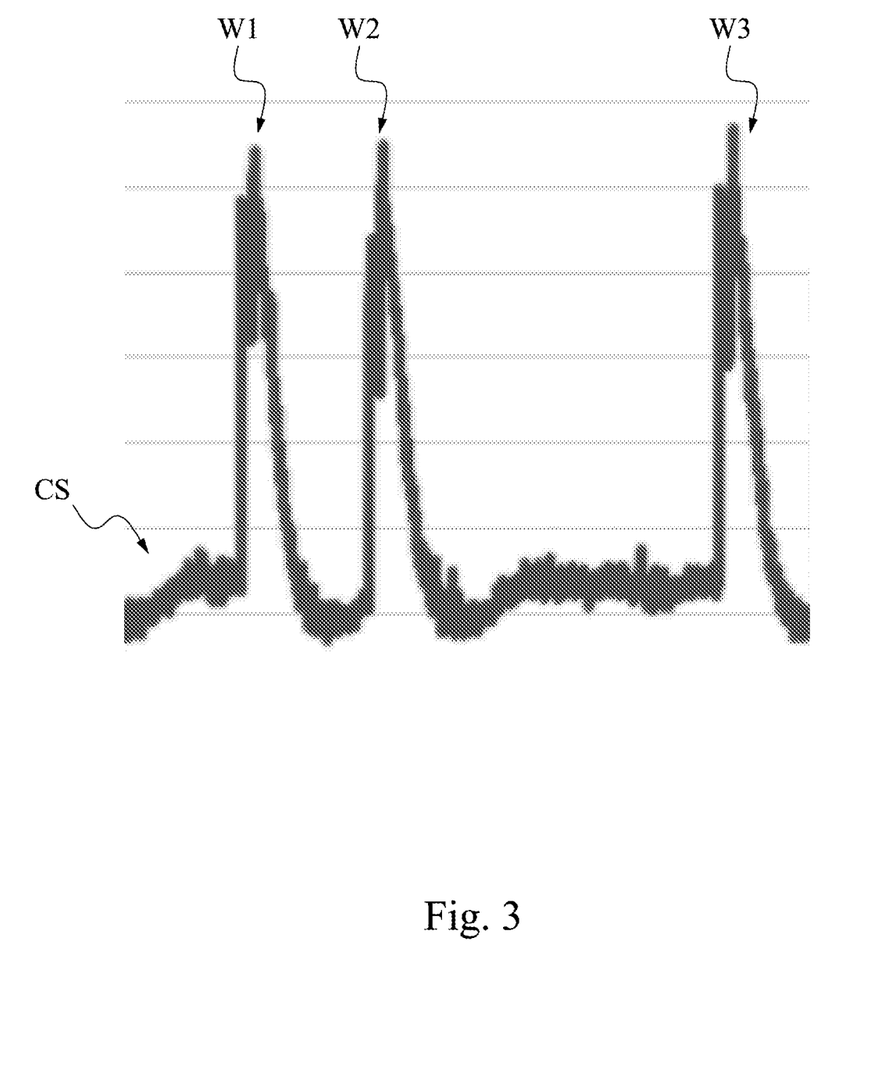
FIG. 3 is a schematic diagram of some waveforms of current signals according to one embodiment of the present disclosure.

FIG. 3 is a schematic diagram of some waveforms of current signals according to one embodiment of the present disclosure. As shown in FIG. 3, in the embodiment, the monitoring system 100 includes the current obtaining device 101, the analyzing device 102 and the graphic device 103. The current obtaining device 101 obtains the current signals generated by the operations of the shaping machine 200 in a continuous manner, and the graphic device 103 can display the continuous waveform diagrams regarding the obtained current signals on the display. As shown in FIG. 3, when the operated shaping machine 200 is not executing the machining programs, the shaping machine 200 is still on. Therefore, in most of the times, the waveform corresponding to the current signals CS retrieved by the current obtaining device 101, from the high speed electricity meter 201, performs a series marginal variations. However, in each time the shaping machine 200 executes the machining program, the high speed electricity meter 201 of the shaping machine 200 measure the current variation with a massive increase. The massive increase can be reflected on a peak in the waveform corresponding to the current signals CS. As can be seen in the figure, three different maximum currents are reflected by the first peak W1, the second peak W2 and the third peak W3, respectively, in which these maximum currents should be corresponding to three machining programs. After the shaping machine 200 executes the machining programs, it can be seen that the waveform corresponding to the current signals CS drops and maintains steady, with some marginal variations that are way insignificant than the first peak W1, the second peak W2 and the third peak W3.

Figure 4:
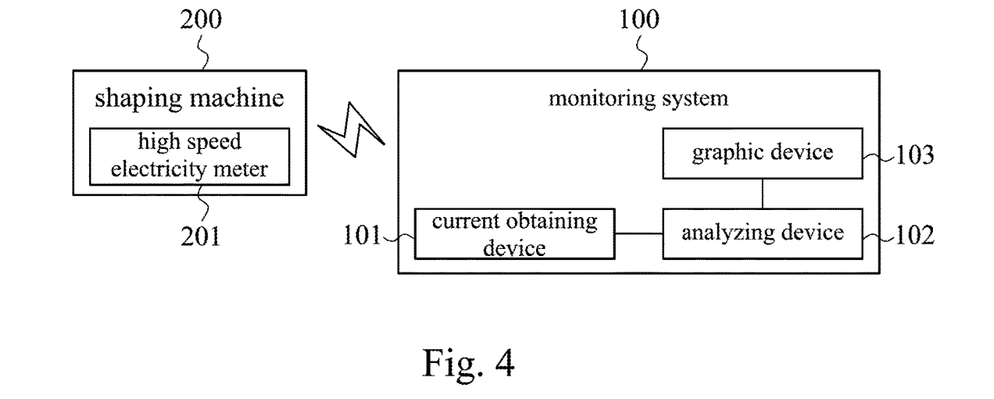
FIG. 4 is a schematic diagram of a monitoring system according to one embodiment of the present disclosure.

FIG. 4 is a schematic diagram of a monitoring system according to one embodiment of the present disclosure. Reference can be made to FIG. 3 for the detail configurations of the shaping machine 200. Moreover, the configurations of the current obtaining device 101 and the analyzing device 102 of the monitoring system 100 can be referenced to FIG. 3 as well. However, this embodiment is slightly different from the embodiment of FIG. 3. Although the graphic device 103 is electrically coupled to the analyzing device 102, the graphic device 103 is configured to graphically display the gap times corresponding to multiple successive machining programs performed by the shaping machine 200, via a display (not shown in figure). For example, if the current obtaining device 101 extracts the current variation data from the current signals, and the current variation data include maximum currents exceeding the threshold, the analyzing device 102 records the occurring time of the maximum currents and calculate the gap time between the occurring time of the maximum currents and the previous maximum current. As such, the analyzing device 102 determines the gap time between each two machining programs executed by the shaping machine 200. In this case, the graphic device 103 can display the occurring time of the maximum currents or the gap times on the display, and the operator of the shaping machine 200 or the administrator of the monitoring system 100 can view the occurring time of the maximum currents or the gap times on the display.

Figure 5:
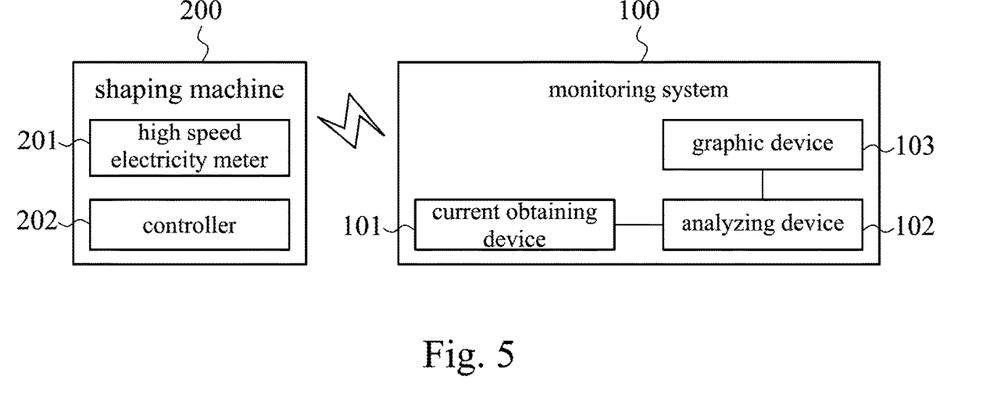
FIG. 5 is a schematic diagram of a monitoring system according to one embodiment of the present disclosure.

FIG. 5 is a schematic diagram of a monitoring system according to one embodiment of the present disclosure. In the embodiment, the monitoring system 100 is communicatively coupled to the shaping machine 200, in which the shaping machine 200 can be the stamping press machine or the injection molding machine. The shaping machine 200 has the high speed electricity meter 201, and the high speed electricity meter 201 is the electricity meter with higher than 20 Hz sample rate. The high speed electricity meter 201 is configured to measure the currents generated by the operated shaping machine 200. In the embodiment, the shaping machine 200 further includes a controller 202. The controller 202 can be a programmable logic controller (PLC), configured to control the shaping machine 200 to execute the machining programs. Usually, the shaping machine 200 can be settled with an execution button (not shown in figure) and the controller 202 is electrically coupled to the execution button. Once the operator of the shaping machine 200 presses the execution button, in response to the action, the controller 202 generates a control signal to drive the shaping machine for the execution of one machining programs.

In the embodiment, the monitoring system 100 includes the current obtaining device 101, the analyzing device 102 and the graphic device 103. In the embodiment, the current obtaining device 101 is communicatively coupled to the high speed electricity meter 201 of the shaping machine 200. When the shaping machine 200 is in operation, the current obtaining device 101 is configured to obtain the current signals generated by the operations of the shaping machine 200. Based on the current signals, the current obtaining device 101 can generate the current variation data regarding each time that the shaping machine 200 executes the machining programs, in which each piece of the current variation data includes the maximum current and the occurring time corresponding to the time that the maximum current being recorded. When the current obtaining device 101 obtains the current signals, the analyzing device 102 extracts the occurring times corresponding to the occurring times that the maximum currents are recorded, and determine the gap times between the occurring time of one maximum current and the occurring time of the previous maximum current. When any of the gap times exceeds the predetermined threshold, the analyzing device 102 generates the warning signal.

In the embodiment, the analyzing device 102 is communicatively coupled to the controller 202 of the shaping machine 200. The analyzing device 102 is configured to retrieve the control signals from the controller 202 in a continuous manner. According to the control signals, the analyzing device 102 can determine whether the shaping machine 200 is actually driven to execute a machining program at the time corresponding to the occurring time that a maximum current being recorded in the current signals. In other words, by analyzing these control signals, the analyzing device 102 can determine whether the maximum current being recorded in the current signals is indeed generated from a machining program performed by the shaping machine 200. In the embodiment, if the analyzing device 102 determines that the shaping machine 200 is not driven to execute the machining program at the occurring times of some maximum currents, the analyzing device 102 can confirm that the occurring times corresponding to these maximum currents are not the actual times of the executions of the machining programs. Therefore, though the analyzing device 102 indeed extracts the maximum currents from the current signals, the retrieved control signals provide possibilities for the analyzing device 102 to distinguish false events. When the false events are detected, the analyzing device 102 can discard the occurring time corresponding to these false events that the machining programs are not executed. And the analyzing device 102 can eliminate the times corresponding to these false events in the calculation of the gap times between each pair of the successive machining programs.

In the embodiment, the graphic device 103 of the monitoring system 100 is configured to graphically display, on a display (not shown in figure), the gap times between each two successive machining programs executed by the shaping machine 200. For example, the analyzing device 102 can extract the occurring time of one maximum current and the occurring time of the previous maximum current, then calculate the gap time between these occurring times corresponding to these two maximum currents. In this case, the graphic device 103 can output the values regarding the occurring times corresponding to these maximum currents, or the gap time, on the display.

In some embodiments, when the analyzing device 102 of the monitoring system 100 generates the warning signal, the analyzing device 102 can further generate a gap time suggestion and send the gap time suggestion to the shaping machine 200. For instance, in one embodiment, if the predetermined threshold is settled at 5 seconds, when the analyzing device 102 of the monitoring system 100 determines the gap time between two machining programs executed by the shaping machine 200 is longer than 5 seconds, the analyzing device 102 generates the warning signal accordingly. In the meantime, the analyzing device 102 generates a gap time suggestion according to the value of the predetermined threshold, and the analyzing device 102 send the gap time suggestion to the shaping machine 200. The gap time suggestion includes information suggests that the gap time between two successive machining programs performed by the shaping machine 200 should be shorter than 5 seconds. In this manner, when the operator of the shaping machine 200 receives the gap time suggestion, the operator can consider how to improve the execution gap time based on the gap time suggestion afterwards.

In some embodiments, the analyzing device 102 of the monitoring system 100 can monitor the execution of the machining programs performed by the shaping machine 200 based on the maximum currents in a continuous manner, the analyzing device 102 can further gather the warning signals that indicates the gap times exceeding the predetermined threshold as a fault report. For instance, in one embodiment, if the predetermined threshold is settled at 5 seconds, when the analyzing device 102 of the monitoring system 100 determines the gap time between two machining programs executed by the shaping machine 200 is longer than 5 seconds, the analyzing device 102 generates the warning signal accordingly. The analyzing device 102 can also record all the warning signals to form a fault report, including the time counts of the warning signals, the frequency of the occurrence of the warning signals, or the trends of the occurrence of the warning signals. By analyzing the fault report, the administrator of the monitoring system 100 can find out if there is any long term problem when the shaping machine 200 is in operation.

In some embodiments, the analyzing device 102 of the monitoring system 100 can monitor and record the execution of the machining programs performed by the shaping machine 200 based on the maximum currents in a continuous manner. The analyzing device 102 can further calculate variations among the gap times between each pairs of the successive machining programs to generate a prediction report. For example, in one embodiment, it is assumed that the analyzing device 102 has analyzed the current signals and recorded the occurring time of the maximum currents in a cycle, the analyzing device 102 can accumulate the time counts corresponding to the execution of the machining programs performed by the shaping machine 200 and the average of the gap times in this cycle accordingly. As such, the analyzing device 102 can estimate, or predict, the execution counts of the machining programs performed by the shaping machine 200 in following cycles, and further generate the prediction report based on the predicted execution counts of the machining programs. It is noted, when the gap times between the maximum currents are found different, it is clear that the execution counts of the machining programs predicted by the analyzing device 102 can be different as well. By analyzing the prediction report, the administrator of the monitoring system 100 can find out the efficiency or uptime of the operated shaping machine 200.

In some embodiments, the analyzing device 102 of the monitoring system 100 can monitor and record the execution of the machining programs performed by the shaping machine 200 based on the maximum currents in a continuous manner. The analyzing device 102 can further record the electricity consumption based on the current signals and generate an electricity consumption report regarding the shaping machine 200. For example, in one embodiment, the analyzing device 102 has analyzed the current signals in a cycle and recorded the values of the maximum currents and the occurring times corresponding to the maximum currents. Therefore, the analyzing device 102 can accumulate the values of the current signals in this cycle and to generate the electricity consumption report regarding the shaping machine 200 in this cycle. By analyzing the electricity consumption report, the administrator of the monitoring system 100 can find out the energy consumption of the operated shaping machine 200.

Figure 6:
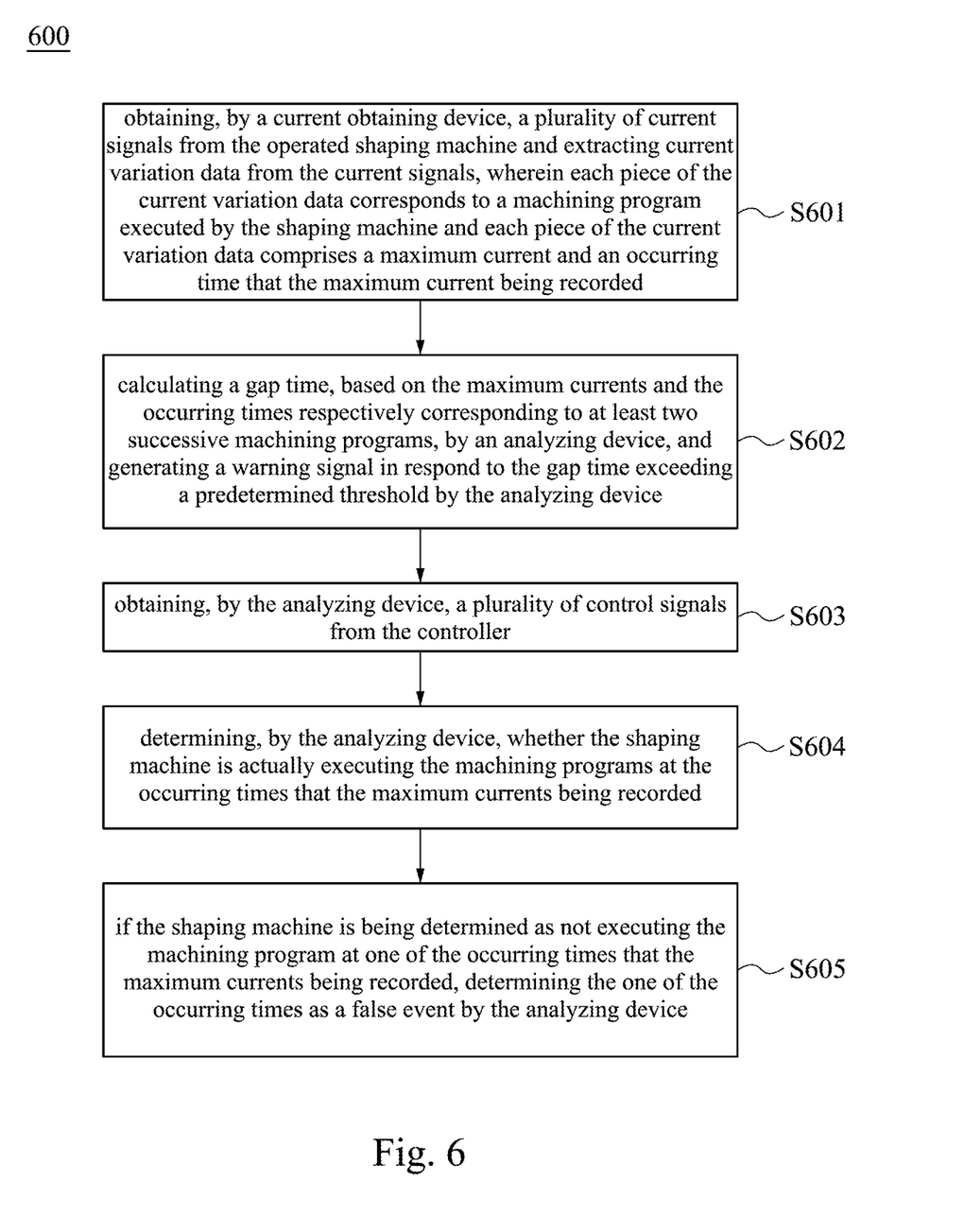
FIG. 6 is a flow chart of a monitoring method according to some embodiments of present disclosure.

The reference is made to FIG. 6, which is a flow chart of the monitoring method 600 according to some embodiments of present disclosure. In the embodiment, the monitoring system 100 performs the monitoring method 600 and the shaping machine 200 being monitored are as the same as the monitoring system 100 and the shaping machine 200 in the embodiments of FIG. 1 to FIG. 5. In the embodiment, the detail steps of the monitoring method 600 are listed in following paragraphs.

Step S601: obtaining, by a current obtaining device, a plurality of current signals from the operated shaping machine and extracting current variation data from the current signals, wherein each piece of the current variation data corresponds to a machining program executed by the shaping machine and each piece of the current variation data comprises a maximum current and an occurring time that the maximum current being recorded. As shown in FIG. 5, in the embodiment, the monitoring system 100 is communicatively coupled to the shaping machine 200. The shaping machine 200 includes the high speed electricity meter 201 and the controller 202, in which the high speed electricity meter 201 is configured to measure the current signals which are generated from the execution of the machining program executed by the shaping machine 200. In the embodiment, the monitoring system 100 includes the current obtaining device 101, the analyzing device 102 and the graphic device 103. When the shaping machine 200 is in operation, the current obtaining device 101 retrieves the current signals generated by the shaping machine 200 from the high speed electricity meter 201 in a continuous manner. The current obtaining device 101 further configured to extract the maximum currents corresponding to the machining programs performed by the shaping machine 200 from the current signals.

Step S602: calculating a gap time, based on the maximum currents and the occurring times respectively corresponding to at least two successive machining programs, by an analyzing device, and generating a warning signal in respond to the gap time exceeding a predetermined threshold by the analyzing device. As shown in FIG. 5, in the embodiment, the monitoring system 100 includes the current obtaining device 101, the analyzing device 102 and the graphic device 103. When the shaping machine 200 is in operation, the current obtaining device 101 retrieves the current signals generated by the shaping machine 200 from the high speed electricity meter 201 in a continuous manner. The current obtaining device 101 further configured to generate the current variation data corresponding to the execution of the machining programs. Each piece of the current variation data includes one maximum current and one occurring time corresponding to the occurring time that the maximum current being recorded. The analyzing device 102 can record the occurring times corresponding to the maximum currents extracted from the current signals, and calculate the gap time between the occurring time of one maximum current and the occurring time of the another maximum current prior to it. Therefore, the analyzing device 102 can calculate the gap times between each pair of the two successive machining programs performed by the shaping machine 200. When any of the gap times is detected exceeding the predetermined threshold, the analyzing device 102 generates the warning signal accordingly.

Step S603: obtaining, by the analyzing device, a plurality of control signals from the controller. As shown in FIG. 5, in one embodiment, the monitoring system 100 is communicatively coupled to the shaping machine 200. The shaping machine 200 includes the high speed electricity meter 201 and the controller 202. The controller 202 can be a programmable logic controller (PLC) configured to control the shaping machine 200 to execute the machining programs. Once the operator of the shaping machine 200 presses the execution button, the controller 202 generates the control signals to drive the shaping machine for the execution of one machining program. In the embodiment, the monitoring system 100 include the current obtaining device 101, the analyzing device 102 and the graphic device 103, in which the analyzing device 102 is communicatively coupled to the shaping machine 200. When each time the operator of the shaping machine 200 presses the execution button, the analyzing device 102 is configured to retrieve the control signals generated by the controller 202 in a continuous manner.

Step S604: determining, by the analyzing device, whether the shaping machine is actually executing the machining programs at the occurring times that the maximum currents being recorded. As shown in FIG. 5, in the embodiment, the analyzing device 102 is configured to retrieve the control signals generated by the controller 202 in a continuous manner. Based on the control signals, the analyzing device 102 can determine whether the shaping machine 200 is actually executing the machining programs at the times that the maximum currents being recorded.

Step S605: if the shaping machine is being determined as not executing the machining program at one of the occurring times that the maximum currents being recorded, determining the one of the occurring times as a false event by the analyzing device. As shown in FIG. 5, in the embodiment, if the analyzing device 102 determines that the shaping machine 200 is not actually executing the machining programs at the occurring times that the maximum currents being recorded, the analyzing device 102 can confirm these occurring times that the maximum currents being recorded are not the actual execution times of the machining programs In this way, the analyzing device 102 can eliminate the occurring times being recognized as false events when calculating the gap times between each pair of the successive machining programs.

It is noted, the establishment of present disclosure brings following advantages. Since conventional arts cannot effectively monitor the gap time between two machining programs, the monitoring system and the monitoring method of present disclosure are provided to establish such functions that the conventional arts are lacking. Therefore, the monitoring system and the monitoring method of present disclosure can be used to reflect the long-term performance and short-term performance regarding the shaping machine or its operator. Moreover, the embodiments of present disclosure can further output the gap times between each pair of the successive machining programs on the display, so the operator of the shaping machine or the administrator of the monitoring system can read the efficiency or the uptime of the shaping machine quickly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A monitoring system, applied on a shaping machine having a high speed electricity meter, the monitoring system comprising:
    a current obtaining device, communicatively coupled to the high speed electricity meter, wherein the current obtaining device is configured to obtain a plurality of current signals from the high speed electricity meter during operations of the shaping machine and in respond to the shaping machine executes a machining program, the current obtaining device extracts current variation data from the current signals, wherein the machining program corresponds to a piece of the current variation data, and the piece of current variation data comprises a maximum current and an occurring time that the maximum current being recorded; and
    an analyzing device, electrically coupled to the current obtaining device, wherein the analyzing device is configured to calculate a gap time, based on the maximum currents and the occurring times respectively corresponding to at least two successive machining programs, wherein in respond to the gap time exceeding a predetermined threshold, the analyzing device generates a warning signal.

2. The monitoring system of claim 1, further comprising:
    a graphic device, electrically coupled to the current obtaining device, the graphic device is configured to output the current variation data in graphics on a display.

3. The monitoring system of claim 1, further comprising:
    a graphic device, electrically coupled to the analyzing device, the graphic device being configured to output the gap time between at least two successive machining programs in graphics on a display.

4. The monitoring system of claim 1, wherein the analyzing device is electrically coupled to a controller of the shaping machine, and the analyzing device is configured to obtain a plurality of control signals from the controller, determine whether the shaping machine is actually executing the machining program at the occurring times that the maximum currents being recorded, and if the shaping machine is being determined as not executing the machining program at one of the occurring times that the maximum currents being recorded, the analyzing device determines the one of the occurring times as a false event.

5. The monitoring system of claim 1, wherein in respond to the analyzing device generates the warning signal, the analyzing device further generate a gap time suggestion and send the gap time suggestion to the shaping machine.

6. The monitoring system of claim 1, wherein the analyzing device monitors the machining program according to the gap times being generated in a continuous manner and gather the warning signals that indicates the gap times exceeding the predetermined threshold as a fault report.

7. The monitoring system of claim 1, wherein the analyzing device calculates variations among the gap times between each pairs of the successive machining program to generate a prediction report.

8. The monitoring system of claim 1, wherein the analyzing device collects the current signals to generate an electricity consumption report.

9. The monitoring system of claim 1, wherein the shaping machine comprises stamping press machine and injection molding machine.

10. A monitoring method, applied on a shaping machine having a high speed electricity meter, the monitoring method comprises:
    obtaining, by a current obtaining device, a plurality of current signals from the high speed electricity meter during operations of the shaping machine;
    in respond to the shaping machine executes a machining program, extracting, current variation data from the current signals by the current obtaining device, wherein the machining program corresponds to a piece of the current variation data, and the piece of current variation data comprises a maximum current and an occurring time that the maximum current being recorded;
    calculating a gap time, based on the maximum currents and the occurring times respectively corresponding to at least two successive machining programs, by an analyzing device; and
    in respond to the gap time exceeding a predetermined threshold, generating a warning signal by the analyzing device.

11. The monitoring method of claim 10, further comprising:
    outputting, on a display of a graphic device, the current variation data in graphics.

12. The monitoring method of claim 10, further comprising:
    outputting, on a display of a graphic device, the gap time between at least two successive machining programs in graphics.

13. The monitoring method of claim 10, wherein the shaping machine further having a controller, the monitoring method further comprises:
    obtaining, by the analyzing device, a plurality of control signals from the controller;
    determining, by the analyzing device, whether the shaping machine is actually executing the machining program at the occurring times that the maximum currents being recorded; and
    if the shaping machine is being determined as not executing the machining program at one of the occurring times that the maximum currents being recorded, determining the one of the occurring times as a false event by the analyzing device.

14. The monitoring method of claim 10, further comprising:
- in respond to the warning signal is generated, generating a gap time suggestion by the analyzing device; and
- sending, by the analyzing device, the gap time suggestion to the shaping machine.

15. The monitoring method of claim 10, further comprising:
- monitoring, by the analyzing device, the machining program according to the gap times being generated in a continuous manner;
- gathering, by the analyzing device, the warning signals that indicates the gap times exceeding the predetermined threshold as a fault report.

16. The monitoring method of claim 10, further comprising:
- calculating, by the analyzing device, variations among the gap times between each pairs of the successive machining program to generate a prediction report.

17. The monitoring method of claim 10, further comprising:
- collecting, by the analyzing device, the current signals to generate an electricity consumption report.

18. The monitoring method of claim 10, wherein the shaping machine comprises stamping press machine and injection molding machine.

* * * * *